(12) United States Patent
Megiddo et al.

(10) Patent No.: US 6,892,181 B1
(45) Date of Patent: May 10, 2005

(54) SYSTEM AND METHOD FOR IMPROVING THE EFFECTIVENESS OF WEB ADVERTISING

(75) Inventors: Nimrod Megiddo, Palo Alto, CA (US); Xiaoming Zhu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 09/658,632

(22) Filed: Sep. 8, 2000

(51) Int. Cl.[7] .............................................. G06F 17/60
(52) U.S. Cl. ............................................. 705/14; 705/1
(58) Field of Search ...................................... 705/1, 14

(56) References Cited

U.S. PATENT DOCUMENTS

| | | | | |
|---|---|---|---|---|
| 5,572,643 A | * | 11/1996 | Judson | 709/218 |
| 5,740,549 A | * | 4/1998 | Reilly et al. | 705/14 |
| 5,809,242 A | * | 9/1998 | Shaw et al. | 709/217 |
| 5,848,397 A | * | 12/1998 | Marsh et al. | 705/14 |
| 5,946,646 A | * | 8/1999 | Schena et al. | 702/177 |
| 6,009,410 A | * | 12/1999 | LeMole et al. | 705/14 |
| 6,011,537 A | * | 1/2000 | Slotznick | 345/733 |
| 6,314,451 B1 | * | 11/2001 | Landsman et al. | 709/203 |
| 6,317,761 B1 | * | 11/2001 | Landsman et al. | 715/513 |
| 6,457,025 B2 | * | 9/2002 | Judson | 715/501.1 |
| 6,487,538 B1 | * | 11/2002 | Gupta et al. | 705/14 |
| 6,496,857 B1 | * | 12/2002 | Dustin et al. | 709/219 |
| 6,516,338 B1 | * | 2/2003 | Landsman et al. | 709/203 |
| 2002/0007393 A1 | * | 1/2002 | Hamel | 709/203 |

FOREIGN PATENT DOCUMENTS

| | | | | |
|---|---|---|---|---|
| JP | 09091215 A | * | 4/1997 | G06F/13/00 |
| WO | WO 01/043014 A1 | * | 6/2001 | |

OTHER PUBLICATIONS

"Cache on delivery—Web–caching is being touted as a way to ease congestion an avoid the cost of extra bandwidth. But, as Andy Donoghue finds, it is not without its problems." Network News, p25, Sep. 9, 1998.*

* cited by examiner

*Primary Examiner*—John Weiss
*Assistant Examiner*—Jonathan Ouellette
(74) *Attorney, Agent, or Firm*—Lacasse & Associates, LLC; Randy W. Lacasse; Ramraj Soundararajan

(57) ABSTRACT

A system and method for improving the effectiveness of web advertising by allowing a user to return and request a previously displayed ad that appeals to the user. Generally, the system employs an intelligent browser cache maintained within a user's terminal to keep web pages in cache and maintain information about hyperlinks contained therein. Furthermore, the system allows for the storing of ads in a bookmark memory without clicking on the ads. The bookmark memory is either permanently maintained or temporarily stored for a predetermined time period at the user's terminal to allow the user view all the stored ads at a later time. The system further includes an algorithm for computing the differences between previously visited pages stored in the intelligent browser cache and a new page in terms of their hyperlinks. Presented to the user in separate windows are all the ads from both the old and new pages to aid the user in deciding whether to click and visit a different page or to save the displayed page for later use. Finally, the system permits the user to request for ads previously displayed at a particular position by pointing his mouse to the current ad at such a location.

12 Claims, 5 Drawing Sheets

SYSTEM AND METHOD FOR IMPROVING THE EFFECTIVENESS OF WEB ADVERTISING

BACKGROUND OF THE INVENTION

1. Field of Invention

The present invention generally relates to advertising over a network such as the Internet. More specifically, the present invention is related to a method and system for improving the effectiveness of Internet advertising.

2. Discussion of Prior Art

On-line advertising systems provide advertisements (ads) to users in a variety of formats such as banners that may be displayed at the top or bottom of a web page on the user's browser. Such ads may include scrolled information containing images, texts or objects that change with time. The banner ad serves as an HTML (Hypertext Markup Language) link that allows the user to be linked to a specific web page if the user clicks on the banner ad. The browser accomplishes this by generating a HTTP (Hypertext Transfer Protocol) message using information encapsulated in the banner to send a request for an object with a specific URL (Uniform Resource Locator), for example, the advertisers home page.

Currently, advertising on web pages is essentially related to the content of the page. The returned page may be unique in the sense that it is composed especially for the user and the system decides which advertisements to return together with the page. Due to limited space on the displayed web page and the fact that a web page is only viewed for a short period of time, advertisers try to change the displayed ads quickly. The ads can either be part of one dynamic "gif" (Graphic Interchange Format) file or an applet which fetches more ads. The problem with this method is that some times a user may indeed be interested in one of the ads but misses it and then has no way of returning to it. The problem is even more severe when the user goes to a first URL, sees an ad there, then goes to a second URL, and then returns to the first URL. By the time the user returns to the first URL, the ad has been replaced and leaves no opportunity for retrieval.

The present invention overcomes the above mentioned drawbacks by providing a method and system that increases the effectiveness of advertising by allowing the user to return and request previously displayed ads that are of interest.

SUMMARY OF THE INVENTION

A system and method for improving the effectiveness of web advertising by allowing a user to return and request a previously displayed ad that appeals to the user. Generally, the system employs an intelligent browser cache maintained within a user's terminal to keep web pages in cache and maintains information about hyperlinks contained therein. Furthermore, the system allows for storing ads in a bookmark memory without clicking on the ads. The bookmark memory is either permanently maintained or temporarily stored for a predetermined period of time in the user's terminal to allow the user the ability to view stored ads at a later time. The system further includes an algorithm for computing the differences between previously viewed pages stored in the intelligent browser cache and a new page (currently viewed page) in terms of their hyperlinks. Presented to the user, in separate windows, are ads from both new and previously viewed (old) pages to aid the user in deciding whether to click and visit a different page or to save the displayed page for later use. Finally, the system permits the user to request ads previously displayed at a particular position by pointing (with a mouse) to the current ad at such a location.

DESCRIPTION OF THE PREFERRED EMBODIMENTS

Figure 1:
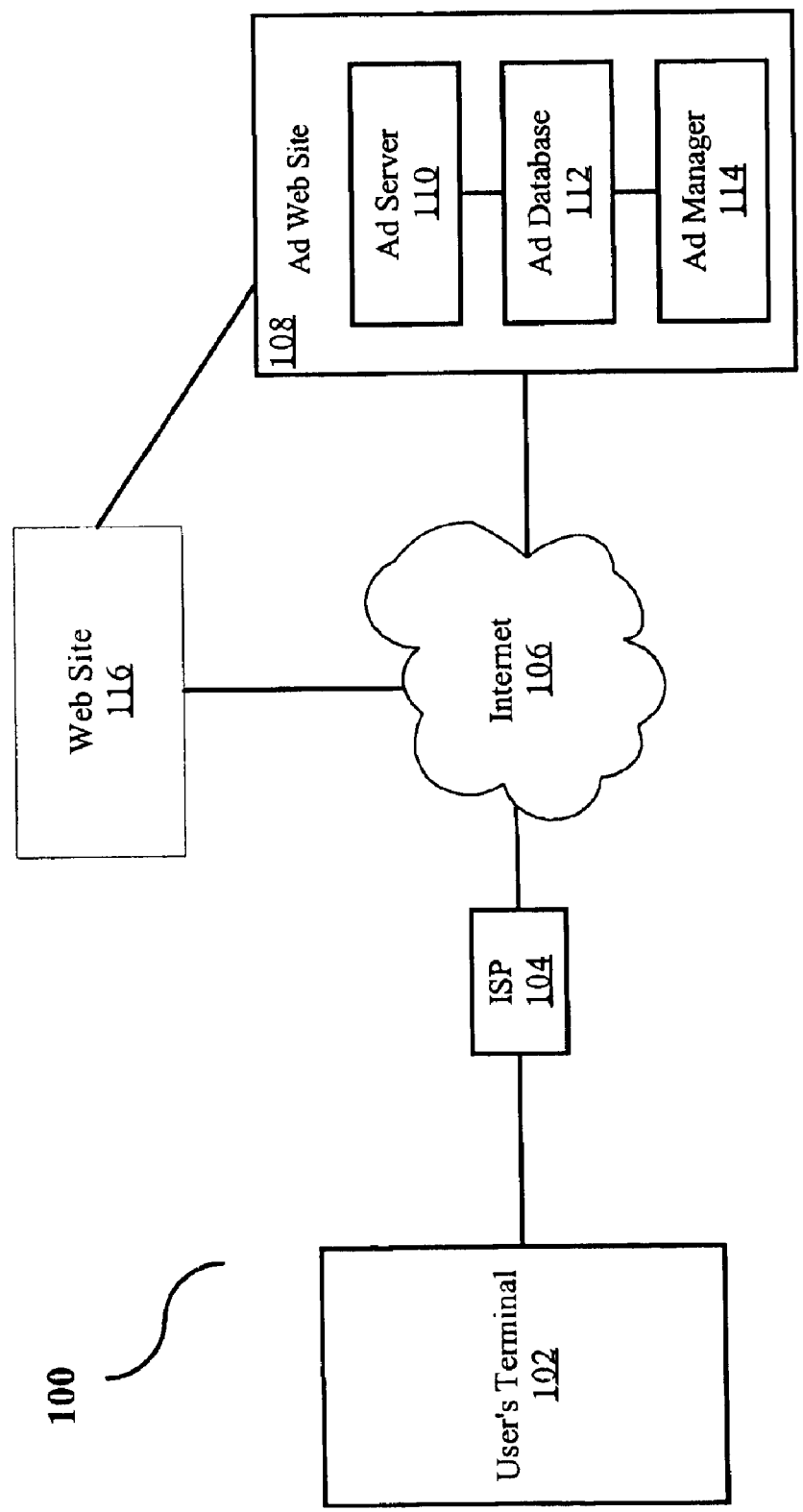
FIG. 1 illustrates the general environment for on-line advertising system.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications and is not intended to limit the invention to the embodiment illustrated. Those skilled in the art will envision many other possible variations within the scope of the present invention.

FIG. 1 illustrates a general environment 100 for the present invention. Internet 106 comprises a group of networks that are interconnected so that they appear to be one continuous large network. Individuals can access remote servers to obtain information over the Internet with a conventional browser contained within user's terminal 102 and an associated ISP (Internet Service Provider) 104. Exemplary ISP 104 may be, for example, on-line computer services/portals such as AOL®, Compuserve®, Netcom®, Msnetwork®, Yahoo®, etc., that provide e-mail; forums; software downloads; news; weather; sports; financial; or other like information; e-commerce; on-line gaming; or other features over the Internet to its subscribers. Web site 116 with at least one web server (not shown) is in communication with the Internet and responds to a request from user's terminal 102 via ISP 104. Responses may include, for example, but not limited to files or information from at least one database (not shown) contained within the web site 116. Furthermore, web site 116 typically is linked to ad web site 108. Ad web site 108 includes ad server 110 that retrieves one or more ads from ad database 112 in the form of a banner or other equivalent types of Internet ads that contain a HTML link. The ad is to be displayed when a page of information such as file or database information is returned to user terminal 102. Ad web site 108 further includes ad manager 114 that controls and runs ad server 110 and ad database 112. Controlling ad server 110 and ad database 112 includes, but is not limited to, the following functions: receiving statistical information from ad server 110 which indicates what ads have actually been served, profiling intelligent selection, configuring the statistics from the ad server and providing such information to ad database 112. Additionally, in an alternate embodiment, ad web site 108 is accommodated within web site 116.

Figure 2:
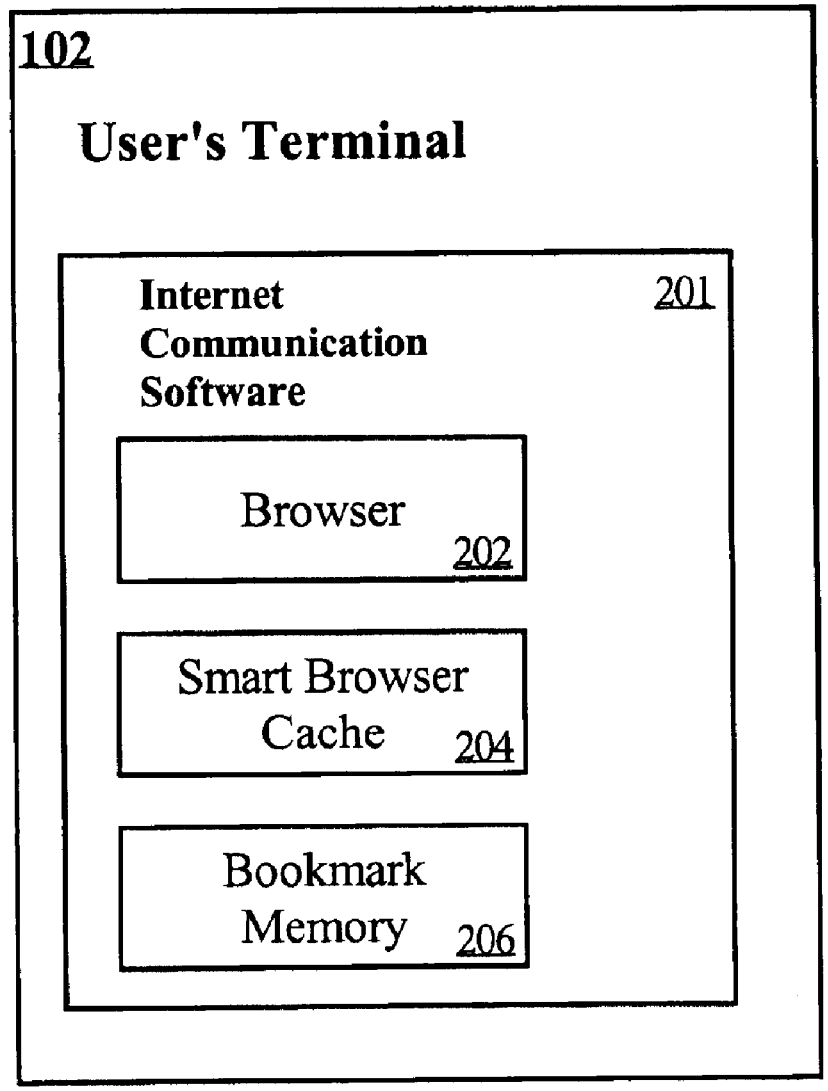
FIG. 2 illustrates user's terminal.
Figure 4:
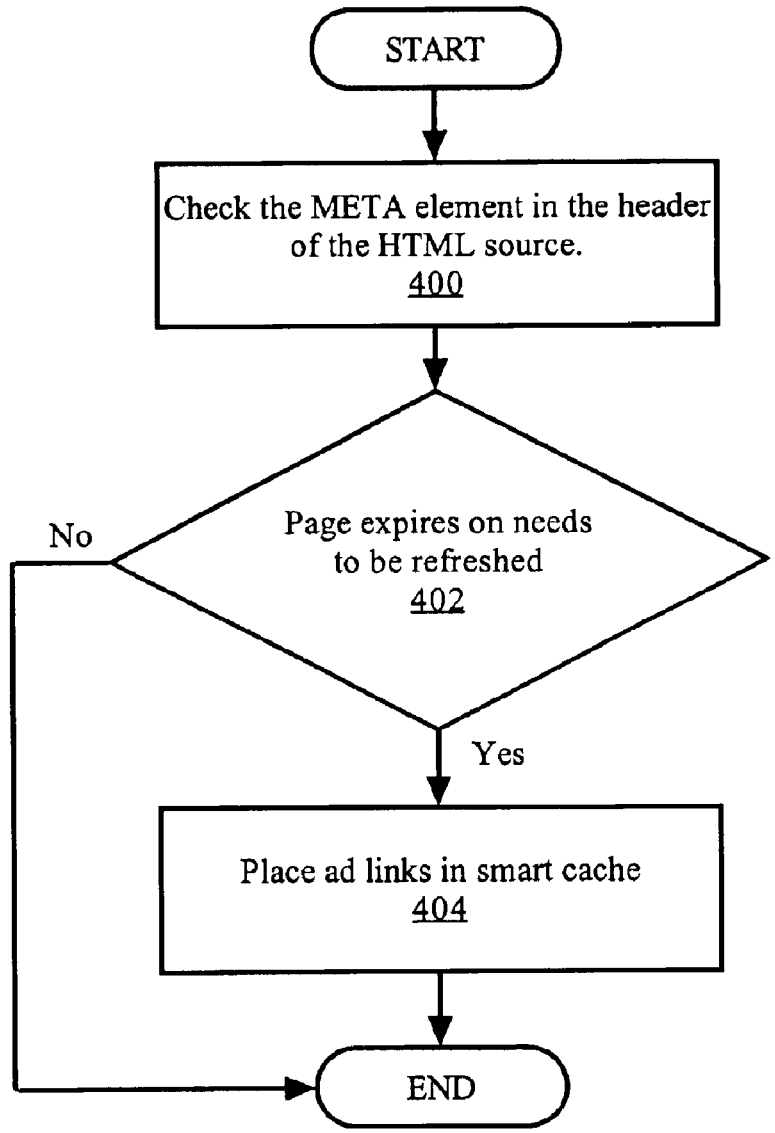
FIG. 4 illustrates a flow diagram of identifying an expiration date.

FIG. 2 further defines the user's terminal 102 as including Internet communication software 201 such as offered by Netscape® which comprises browser 202. Also included with user's terminal 102 is intelligent browser cache 204 and bookmark memory 206. Intelligent browser cache 204 may be, for example, but not limited to the following in nature: real, virtual or physical. In addition, the present invention should not be limited based on the location of intelligent browser cache 204. The intelligent cache system employed by browser 202 stores web pages in cache and also maintains information about hyperlinks contained in these pages. Moreover, the intelligent cache system pays attention to (monitors) pages that are designed by their authors to refresh each time they are requested or at short time intervals. FIG. 4 and the corresponding discussion below describe how the system pays attention to author's pages. The META element of an HTML document is often used to identify an expiration date 400. For example the following META declaration:
<META http-equiv="Expires" content="Mon, 1 May 2000 01:00:00 GMT">
can be used by caches to determine when to fetch a fresh copy of the associated document. Another example of a META declaration is:
<META http-equiv="refresh" content="60">
which is often used by the browser to repeatedly fetch a fresh copy of the associated document every 60 seconds.

A page that does not expire and does not need to be refreshed is placed in cache, and so are all the references and ads included in that page. Thus, when retrieved from cache, such a page displays the same ads. A clickable ad is described in the HTML source file as in the following example:

```
<A HREF =
"http://ad.doubleclick.net/jump/homepgtable.av.com/fullbanner;sz=468×
60;ord=130914492?">
<IMG SRC =
"http://ad.doubleclick.net/ad/homepgtable.av.com/fullbanner;sz=468×60;
ord=130914492?"border=0 height=60 width=468>
</A>
```

The browser displays the image whose URL is:
http://ad.doubleclick.net/ad/homepgtable.av.com/fullbanner;sz=468×60;ord=130914492?
If the user clicks the mouse on the displayed ad, the browser fetches and displays the image whose URL is:
http://ad.doubleclick.net/jump/homepgtable.av.com/fullbanner;sz=468×60;ord=130914492

The system of present invention recognizes pages that need to be refreshed 402 and preserves their ads in cache 404 in case the user wishes to see them later.

Furthermore, the intelligent cache system keeps and indexes the hyperlinks contained in such pages. While the user navigates through a web site, ads contained within the web pages are automatically saved to bookmark memory 206 without adding, clicking, or indicating to view any particular ad. This feature creates a significant advantage over conventional browsers in the sense that it allows for an individual that may not want to interrupt the main task being performed, but would like to see the ad later and navigate to a new page. Bookmark memory 206 is permanently maintained or temporarily stored for a predetermined period of time, and enables the user to view all the ads that were previously saved. The bookmark memory is maintained as a file, which is stored in the disk drive of the user's computer system. It is up to the user to choose for how long to keep the ads. The decision reflects the tradeoff between the desire to be able to retrieve as many ads as possible and the limited storage space. An illustration of the detection of changes in web pages is described in FIGS. 3a–3b.

Figure 3A:
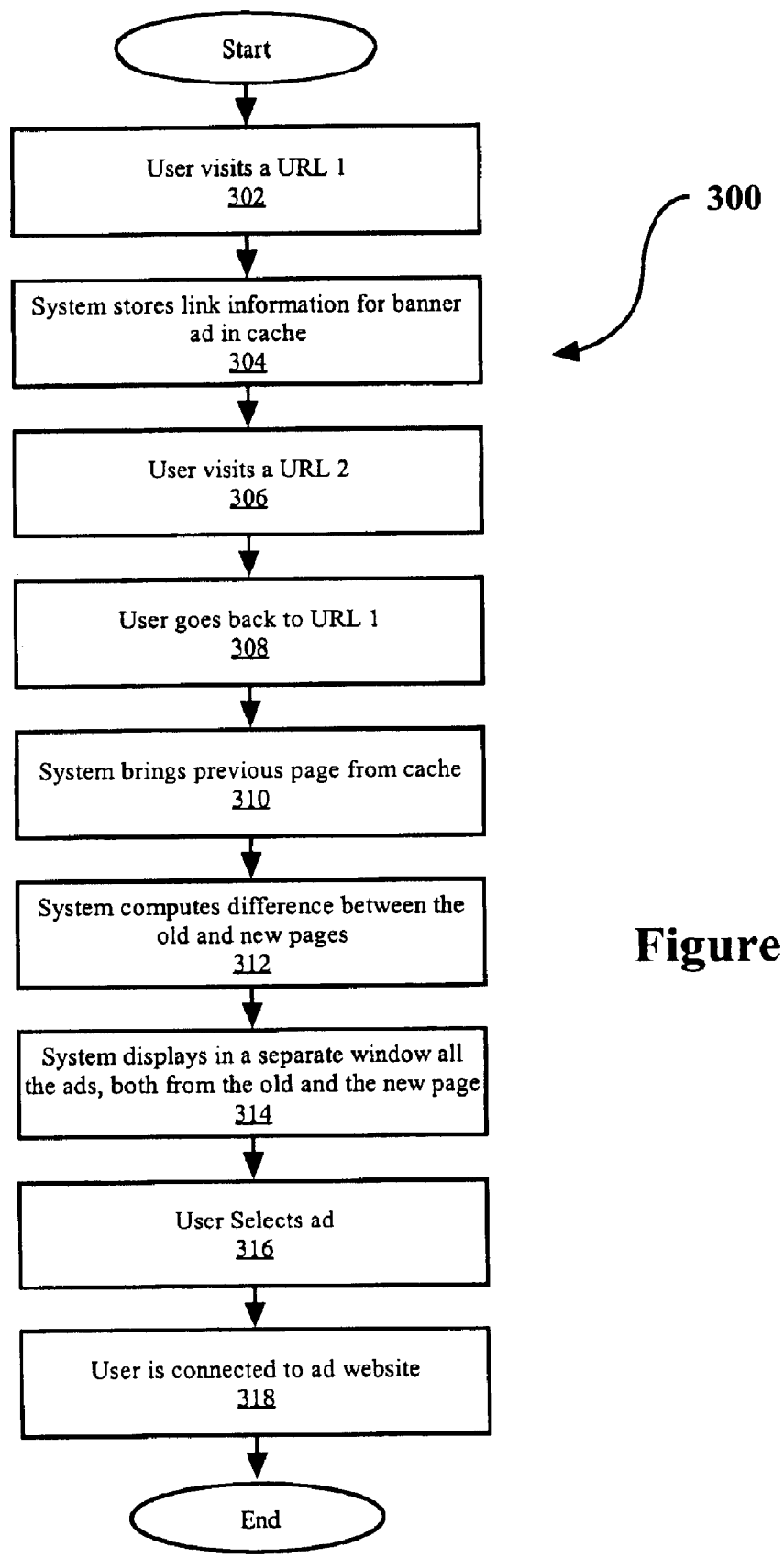
FIG. 3a illustrates a flow diagram depicting steps for retrieving and computing the differences between the new and old web pages.
Figure 3B:
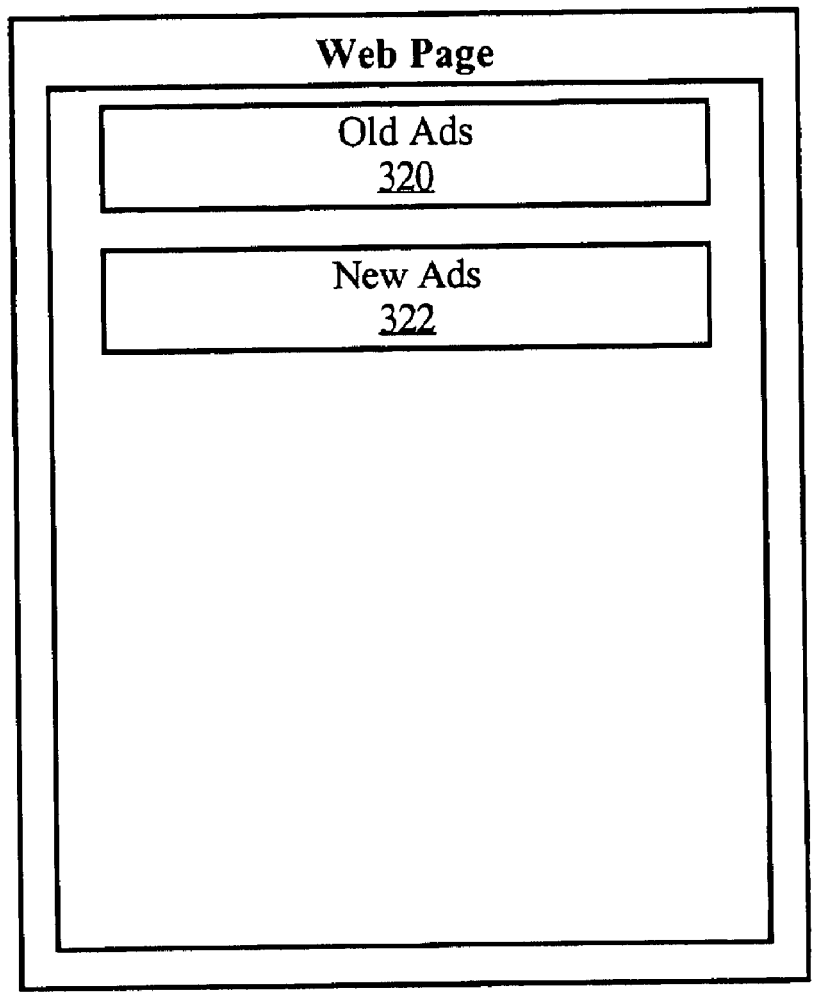
FIG. 3b illustrates the outline of a web page showing a plurality of ad windows.

FIG. 3a illustrates a flow diagram 300 depicting steps for retrieving and computing the difference between new and old web pages. In step 302, an individual visits a first URL 1 via Internet communication software 201 as described above in FIGS. 1 & 2, the system proceeds to store link information pertinent to banner ads contained within said first URL 1 in intelligent browser cache 204 as illustrated in step 304. In step 306, the individual visits a second URL 2 and as previously discussed, intelligent browser cache 204 maintains information related to banner ads contained within the second URL 2. In step 308, the individual revisits the first URL 1. The system therefore in step 310, fetches one or more previous pages associated with (URL 1) from cache and proceeds in step 312 to compute the difference between the previously stored web page(s) (URL1) and the new web page(s) (URL2) in terms of their hyperlinks. In step 314, the system displays one or more windows of ads, both from the old and new web pages. An illustration of such a display is shown in FIG. 3b where old ads are represented in window 320 and the new ads are represented in window 322. Specific ad window sizes, placement or the number thereof are not critical to practicing of the invention. For instance, ads could also be displayed in sorted order based on words in the links or words displayed. Referring back to FIG. 3a, in step 316, the user selects an ad from the displayed windows in FIG. 3b. The system in step 318 therefore proceeds to connect the user to ad web site 108. In an alternate embodiment, after step 314 the system presents the user with a choice of either clicking and visiting a different page, or saving the newly generated page for later use.

Finally, the system allows for the retrieval of old ads based on the user's request. The mouse is positioned on the location, so that mouse coordinates are recognized. Alternately, the system can present to the user a clickable small square where a clock of the mouse would cause the system to fetch all the ads that were displayed in that location of a page with the same URL. As described above, when the system saves hyperlinks of pages that are designated to refresh in the intelligent browser cache, the system also allows the user to indicate, with the mouse positioned on a current ad, that the user is interested in ads that were previously displayed in the same position. Based on the mouse position, the system fetches from the intelligent browser cache the old hyperlinks to ads that were displayed in the same position, and redisplays them to the user.

The above enhancements to improving the effectiveness of web advertising and its described functional elements are implemented in various on-line web advertising systems. For example, the present invention may be implemented from a web site that contains its own ad server or a web site that is linked to a third party advertising web site. The present invention may be implemented on a conventional Internet communication software or browser.

CONCLUSION

A system and method has been shown in the above embodiments for the effective implementation of improving the effectiveness of Internet advertising. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by types of ads, number of ads stored, method of storing, size, location or type of cache or software/program, computing environment, or specific computing hardware.

What is claimed is:

1. A computer-based method for enhancing the effectiveness of on-line advertising, said on-line advertising performed over a communications network including one or more of: a web site, an ad web site that includes an ad database, at least one remote terminal, and a communication network interconnecting said web site, ad web site and said remote terminal, said computer-based method comprising the following steps:

processing a request of one or more web pages from said web site;

automatically receiving one or more ads associated with each of said one or more web pages and displaying said one or more web pages and associated ads at said remote terminal;

retaining in computer storage previously viewed web pages and associated one or more ads;

automatically receiving a request to retrieve one or more previously displayed ads from said computer storage;

dynamically retrieving and rendering said requested one or more new ads and previously viewed ads at said remote terminal, thereby enhancing the effectiveness of said on-line advertising, and wherein when a previously viewed web page stored in said computer storage is revisited as a new web page, differences between said new web page and said previously viewed web page are determined in terms of their associated hyperlinks, and ads associated with said new page and said previously viewed web page are displayed separately at said remote terminal.

2. A computer-based method for enhancing the effectiveness of on-line advertising, as per claim 1, wherein said computer storage comprises a bookmark memory storing said received ads associated with web pages and an intelligent browser cache storing said displayed web pages and hyperlinks contained in said displayed web pages.

3. A computer-based method for enhancing the effectiveness of on-line advertising, as per claim 2, wherein said bookmark memory is either permanently maintained or temporarily kept for a predetermined period of time.

4. A computer-based method for enhancing the effectiveness of on-line advertising, as per claim 1, wherein said ads from said new page and said previously viewed web page are displayed at said remote terminal in one or more windows separate from a window displaying said revisited new page.

5. A computer-based method for enhancing the effectiveness of on-line advertising, as per claim 1, wherein said on-line advertising may be implemented locally or remotely on one or more computer-based systems, across networks or communication mediums.

6. A computer-based method for enhancing the effectiveness of on-line advertising, as per claim 1, wherein said communication network comprises any of LANs, WANs, Internet or Web-based networks.

7. A computer-based system for retrieving previously viewed Internet web-advertising comprising:

a requestor terminal receiving one or more web pages from a remote web site;

said web pages including one or more ads retrieved from an ad web site associated with said web site, said ad web site comprising any of: an ad server, ad database and ad manager, a display presenting said one or more web pages and one or more ads;

computer storage retaining previously viewed web pages and associated one or more ads and hyperlink information, and wherein when a previously viewed web page stored in said computer storage is revisited as a new web page, said computer-based system dynamically retrieves and displays previous position specific ads upon automatically receiving a selection of a corresponding position of advertising in said new web page.

8. A computer-based system for retrieving previously viewed web-advertising, as per claim 7, wherein said computer storage further comprises a smart browser cache storing said displayed web pages and hyperlinks associated with web pages and a bookmark memory storing said received ads associated with web pages.

9. A computer-based system for retrieving previously viewed web-advertising, as per claim 8, wherein said bookmark memory is permanently maintained or temporarily kept for a predefined period of time.

10. A computer-based system for retrieving previously viewed web-advertising, as per claim 7, further comprising a comparator to determine differences between a new page and a previously viewed web page in terms of their associated hyperlinks.

11. A computer-based method for enhancing the effectiveness of on-line advertising, said on-line advertising performed over a communications network including one or more of: a web site, an ad web site that includes an ad database, at least one remote terminal, and a communication network interconnecting said web site, ad web site and said remote terminal, said computer-based method comprising the following steps:

processing a request of one or more web pages from said web site using browser software;

automatically receiving one or more ads associated with each of said one or more web pages and displaying said one or more web pages and associated ads at said remote terminal;

retaining in browser cache previously viewed web pages and associated one or more ads and maintaining information about hyperlinks contained in said previously viewed web pages;

automatically receiving a request to retrieve one or more previously displayed ads from said computer storage;

dynamically retrieving and rendering said requested one or more new ads and previously displayed ads at said remote terminal thereby enhancing the effectiveness of said on-line advertising, and wherein when a previously viewed web page stored in said cache is revisited as a new web page, differences between said new web page and said previously viewed web page are determined in terms of their associated hyperlinks, and ads associated with said new page and said previously viewed web page are displayed at said remote terminal in one or more windows separate from a window displaying said revisited new page.

12. A computer-based e-commerce method for enhancing the effectiveness of on-line advertising, said on-line advertising performed over a communications network including one or more of: a web site, an ad web site that includes an ad database, at least one remote terminal, and a communications network interconnecting said web site, ad web site and said remote terminal, wherein said method comprises a plurality of steps, one or more of said steps implemented locally or remotely across said communications network, said method comprising:

processing a request of one or more web pages from said web site;

automatically receiving one or more ads associated with each of said one or more web pages and displaying said one or more web pages and associated ads at said remote terminal;

retaining in computer storage previously viewed web pages and associated one or more ads;

automatically receiving a request to retrieve one or more previously displayed ads from said computer storage; and dynamically retrieving and rendering said requested one or more new ads and previously viewed ads at said remote terminal, thereby enhancing the effectiveness of said on-line advertising, and wherein when a previously viewed web page is revisited as a new web page, said step of rendering said requested ads further comprising automatically displaying previous position specific ads upon receiving a selection of a corresponding position of advertising in said new page.

* * * * *